US012612577B2

(12) United States Patent
Nahrwold

(10) Patent No.: US 12,612,577 B2
(45) Date of Patent: Apr. 28, 2026

(54) PERFUMED COMPOSITIONS, PROCESS OF PREPARING THEREOF AND USES

(71) Applicant: MINASOLVE SAS, Beuvry-la-Forêt (FR)

(72) Inventor: Markus Nahrwold, Minden (DE)

(73) Assignee: MINASOLVE SAS, Beuvry-la-Forêt (FR)

( * ) Notice: Subject to any disclaimer, the term of this patent is extended or adjusted under 35 U.S.C. 154(b) by 922 days.

(21) Appl. No.: 17/757,320

(22) PCT Filed: Dec. 16, 2020

(86) PCT No.: PCT/EP2020/086433

§ 371 (c)(1),
(2) Date: Jun. 14, 2022

(87) PCT Pub. No.: WO2021/122756

PCT Pub. Date: Jun. 24, 2021

(65) Prior Publication Data

US 2022/0348840 A1 Nov. 3, 2022

(30) Foreign Application Priority Data

Dec. 20, 2019 (BE) .................................. 2019/5963

(51) Int. Cl.
*C11B 9/00* (2006.01)
*C11B 9/02* (2006.01)

(52) U.S. Cl.
CPC ............ *C11B 9/0015* (2013.01); *C11B 9/027* (2013.01)

(58) Field of Classification Search
CPC ...... A61K 8/922; A61K 8/345; A61K 8/9789; A61K 8/9755; C11B 9/00; C11B 9/027; C11B 9/0015
USPC ....................................................... 512/25, 1
See application file for complete search history.

(56) References Cited

FOREIGN PATENT DOCUMENTS

| | | | | |
|---|---|---|---|---|
| CN | 109464344 A * | 3/2019 | .......... A61K 8/0212 |
| EP | 2207539 | 12/2008 | |
| EP | 2807925 A1 | 3/2014 | |
| EP | 2931050 | 6/2014 | |
| EP | 2931050 B1 | 10/2016 | |
| FR | 3015283 A1 | 6/2015 | |
| WO | 2021/122756 A1 | 6/2021 | |

OTHER PUBLICATIONS

Teng et al, CN 109464344 Machine Translation, Mar. 15, 2019 (Year: 2019).*
ISR-WO dated Apr. 6, 2021 for parent application PCT/EP2020/086433.

* cited by examiner

*Primary Examiner* — Jessica Whiteley
(74) *Attorney, Agent, or Firm* — Vorys, Sater, Seymour and Pease LLP

(57) ABSTRACT

The current invention relates to a stabilized perfumed aqueous composition comprising: a) 95.1 to 99.9 wt. % of a component (A), wherein said component (A) is a perfume component in a concentration of at most 30 wt. % in water; b) 0.1 to 4.9 wt. % of a component (B), wherein said component (B) is 1,2-pentanediol. In another aspect, the invention relates to a process for stabilizing a perfumed aqueous composition by addition 0.1 to 4.9 wt. % of 1,2-pentanediol to said perfumed aqueous composition, wherein said perfumed aqueous composition is a composition comprising at most 30 wt. % of a perfume component in water. In a third aspect, the invention relates to the use of stabilized perfumed aqueous composition in cosmetics, personal care and cleaning products.

14 Claims, No Drawings

PERFUMED COMPOSITIONS, PROCESS OF PREPARING THEREOF AND USES

FIELD OF THE INVENTION

The present invention relates to a stabilized perfumed aqueous composition comprising a solution of perfume component in water and 1,2-pentanediol. In a second aspect, the present invention also relates to a process for stabilizing of a perfumed aqueous composition comprising a perfume component in water by addition of 1,2-pentanediol. In another aspect, the present invention pertains to the use of the stabilized perfumed aqueous composition or a perfumed aqueous composition stabilized in a process of the invention in various cosmetics, personal care and cleaning products.

BACKGROUND

Natural perfumed waters, also known as hydrosols, hydrolats, herbal distillates and essential waters are aqueous distillates obtained by steam treatment of fresh or dried plant materials. Distilled waters derived from flowers are also called floral waters. All these waters are often by-products of essential oils. Despite being safe and cost-effective perfuming ingredients for personal care and home care products said natural perfumed waters are scarcely used as such, due to possible phase separations and microbiological infestations.

Hydrolats are not sterile and hence need to be kept refrigerated to preserve their freshness. Just like many other aqueous systems, they are prone to infestations by microorganisms. Such infections represent a health risk for consumers due to the potential presence of microbial toxins or pathogenic germs. Microbes can also change the overall composition of a hydrolat, eventually leading to olfactory off-notes. In any case, the risk for microbial contamination shortens the shelf-life of hydrolats. This imposes a significant economic risk, especially in cases where the perfumed waters need to be transported over longer distances or through tropical areas.

EP 2931050 discloses an antimicrobial composition comprising mixtures of botanical extracts, synthetic antimicrobial preservative agents and essential oils which do not rely solely upon alcohol to produce their antimicrobial effects. However, said compositions further comprise one or more organic acids in a concentration from 0.05 and 0.5 w/w % one or more alcohols as solvents and solubilizers in a concentration of up to 25 w/w % one or more alkanediols in a concentration between 0.05 and 5 w/w %, one or more antimicrobial agent and one or more anti-irritant. In particular, EP 2931050 teaches that alkanediols contribute to the antimicrobial activity of complex aqueous compositions containing plant extracts and essential oils. All compositions disclosed in EP 2931050 contain at least one additional solubilizer, surfactant, solvent, or thickener as an additional stabilizing agent. These additional components are selected from PEG 40 hydrogenated castor oil, trideceth 9, caprylyl/capryl glucoside, hydroxypropyl methyl cellulose stearoxy ether, glycerine, propanediol, propylene glycol, Pluronic F127, polysorbate 80, solubilizer 611674. In addition, the disclosed compositions contain alcohol and/or benzoic acid and/or chlorhexidine as an additional antimicrobial agent.

EP 2207539 discloses a skin or surface disinfectant composition with broad spectrum antimicrobial activity comprising one or more essential oil (and/or one or more component thereof) and one or more fruit acid. The compositions of the invention may be used as non-toxic alternatives to conventional disinfectants or may be combined with other antimicrobial agents to enhance their activity.

EP 3285728 discloses a method of enhancing fragrance of a rinse-off cleansing composition before use, comprising, combining: a) from about 35% to about 85%, by weight of the composition of surfactant; b) from about 4% to about 30%, by weight of the composition, of a perfume, wherein the weight percent of perfume is from about 8% to about 90%, by weight of the surfactant; c) from about 6% to about 20%, by weight of the composition, of a hydric solvent and wherein the weight percent of the hydric solvent is from about 7% to about 60%, by weight of the surfactant; and d) from about 2% to about 57%, by weight of the composition, of water; to form the said cleansing composition.

FR3015283 discloses the synergistic stabilizing effect of polyols with 2 to 6 carbon atoms on hydrolats, but only in combination with 2-hydroxybenzoic acid.

CN109464344 discloses the stabilizing effect of 1-1.5% butanediol on a face mask composition containing hydrolats, but only in combination with trehalose, methyl glycol polyether-20, dipotassium glycyrrhizinate, sodium hyaluronate, glycerine, allantoin, potassium lauryl phosphate, acrylates/C10-30 alkanol acrylate cross polymer, and p-hydroxy acetophenone.

EP2807925 discloses the stabilizing effect of 1,2-alkanediols used in formulations containing a small amount of floral water, in combination with phenoxyethanol and either the glyceryl ether "benzyl glycerol" or a mixture of parabens. EP2807925 also discloses a rosemary floral water stabilized with a mixture of different 1,2-alkanediols.

None of above-mentioned products provides a natural perfume composition which does not contain acidifying agent, emulsifying agent or short-chain alcohol. Additives such as preservatives, alcohols, surfactants and the like may cause skin irritation and allergies and thus are not suitable for sensitive consumers. Acidification by acidifiers to pH<5 is mainly effective against bacteria, but it does not prevent a contamination of the such products by fungi (i.e. yeasts and moulds). Short chain glycols, such as propylene glycol or butylene glycol are weak antimicrobial agents and only effective at high concentrations of typically more than 10%. Longer chain glycols such as 1,2-hexanediol, 1,2-octanediol or ethylhexylglycerin can be hardly soluble in water and they are known for changing the physical properties of hydrogels or emulsions. Surfactants are effective in stabilizing dispersions such as suspensions and emulsions, but very high concentrations thereof lead to skin intolerability, allergic reactions, redness and unpleasant feeling on one side and higher cost on the other. However, it may be difficult to incorporate the stabilized perfumed waters in personal care formulations without using the above-mentioned additives.

None of the above-mentioned herbal scent preparations is at the same time water soluble or dispersable without excessive surfactant addition, skin friendly and effective at neutral pH.

It is hence desirable to solve the technical problem of stabilization and prevention of microbial contamination of perfumed waters, preferably without addition of constituents such as preservatives, alcohols, surfactants, acidifiers, short chain glycols, long chain glycols and the like.

It is therefore desirable to solve the technical problem of ensuring a uniform composition of perfumed waters and thus a reliable dosing upon dispensing of such compositions.

Preferably, the technical solution makes use of natural or nature-based materials, which may exert antimicrobial effects, which are well compatible with water and form stable compositions without use of excessive surfactants.

The present invention aims to resolve at least some of the problems and disadvantages of the commonly used plant-derived extracts and perfuming agents mentioned above.

SUMMARY OF THE INVENTION

The present invention and embodiments thereof serve to provide a solution to one or more of above-mentioned disadvantages.

To this end, the present invention relates to a stabilized perfumed aqueous composition comprising:

a) 95.1 to 99.9 wt. % of a component (A), wherein said component (A) is a perfume component in a concentration of at most 30 wt. % in water;

b) 0.1 to 4.9 wt. % of a component (B), wherein said component (B) is 1,2-pentanediol.

Preferred embodiments of the stabilized perfumed aqueous composition are shown in any of the claims 2 to 9.

A specific preferred embodiment relates to the stabilized perfumed aqueous composition of the invention wherein said component (A) comprises from about 0.001 wt. % to about 10.0 wt. % of said perfume component in water.

In another preferred embodiment, the said perfume components of the component (A) in the stabilized perfumed aqueous composition of the invention are chosen from a group containing plant essential oil and/or plant extract and/or isolated fraction and/or isolated compound thereof.

The term "plant essential oil", as used herein, means a concentrated hydrophobic liquid containing volatile (easily evaporated) chemical compounds from plants. Essential oils are also known as volatile oils, ethereal oils, aetherolea, or simply as the oil of the plant from which they were extracted, such as oil of clove. An essential oil is "essential" in the sense that it contains the "essence of" the plant's fragrance—the characteristic fragrance of the plant from which it is derived. Typically, plant essential oils are complex mixtures of volatile plant secondary metabolites belonging to classes of mono- and sesquiterpenes, coumarins and phenylpropanes. The composition of an essential oil may depend to some extent on a plant variety and breeding conditions. However major constituents should be present in the essential oil regardless of the growth conditions, plant variety and method of the extraction of said essential oil.

The term "plant extract" as used herein, means a mixture of compounds or a substance or an active with desirable properties that is removed from the tissue of a plant, usually by treating it with a solvent. Typically, the extraction process is optimized so to obtain a plant extract suitable to be used for a particular purpose.

The term "isolated fraction", as used herein, means a selected or a concentrated part of an extract, typically constituted of targeted secondary plant metabolites or selected class of the compounds. The isolated fraction is typically prepared for a particular use, i.e. to achieve certain effect.

The term "isolated compound", as used herein, means obtaining of a compound in a purity of more than 85 wt. %, preferably more than 90 wt. %, even more preferably preferably more than 95 wt. %, most preferably more than 99 wt. % by employing of one or more of separation and purification techniques such as but not limited to distillation, crystallization, solvent extraction, TLC, column chromatography, flash chromatography, Sephadex chromatography, preparative, semi-preparative or analytical HPLC and the like.

In another preferred embodiment, the stabilized perfumed aqueous composition of the invention comprises at least one plant essential oil as said perfume component of the component (A).

The essential oils in water form natural perfumed waters, known as hydrosols or hydrolats, typically obtainable by a steam distillation of fresh and dried plant materials. The component (A) of the stabilized perfumed aqueous composition of the invention represents a natural or nature-based material which is well compatible with water.

In another preferred embodiment, the content of the components (A) and (B) in the stabilized perfumed aqueous composition of the invention adds up to 100 wt. %.

In said embodiment, the stabilized perfumed aqueous composition of the invention contains only a composition of a perfume component in a concentration of at most 30 wt. % in water as a component (A) and 1,2-pentanediol as a component (B). The present invention unexpectedly solves the problem of the phase separation without the presence of any additional or synthetic surfactant.

In another preferred embodiment, the stabilized perfumed aqueous composition of the invention passes a microbial challenge test according to norms such as ISO 11930, EP or USP.

In another preferred embodiment, the amount of the component (B) added to the component (A) is below the minimum inhibitory concentration of the component (B) against bacteria and/or yeasts and/or moulds, in the stabilized perfumed aqueous composition of the invention.

In another preferred embodiment, the component (A) contains a quantity of a perfume component and wherein said quantity of a perfume component is not completely soluble in water.

In another embodiment, the time of phase separation of the component (A) into the perfume component and the water phase is at least 72 h.

In another preferred embodiment, the perfume components of the component (A) in the stabilized perfumed aqueous composition of the invention, are essential oils, an isolated fraction or isolated compound thereof produced by steam distillation of vegetal raw materials.

In a second aspect, the present invention relates to a process for stabilizing of a perfumed aqueous composition according to claim 10. More particular, the process as described herein provides stabilizing of a perfumed aqueous composition by addition of 0.1 to 4.9 wt. % of 1,2-pentanediol to a perfumed aqueous composition, wherein said perfumed aqueous composition is a composition comprising at most 30 wt. % of a perfume component in water.

The technical problem linked to natural perfumed waters in the prior art is the potential presence of excess essential oil. The oil usually forms a separate organic phase. However, complete phase separation between essential oils and hydrolats can be very time consuming. Small residual droplets of the lipophilic oil can still be present inside the aqueous solution. Upon cooling or storage in a cold area, the solubility of the oily components can further decrease, leading to formation of additional oil droplets. If the perfumed water is packaged into small containers, the overall composition can differ from drum to drum, and also between different layers inside one drum. This may eventually lead to an over-dosage of the lipophilic perfuming ingredients, resulting in an inconsistent odor, incomplete solubility in water or too high a dosage of perfuming ingredients. This may even lead to skin irritation or sensitization. The addition of the 1,2-pentanediol in a concentration of 0.1 to 4.9 wt. % leads to stabilization of the perfumed aqueous composition of the invention and solves the technical problem of phase separation and uneven distribution of the perfume components in the compositions of the invention.

The preferred embodiments of the process of the invention are shown in the dependent claims 11 and 12.

In a preferred embodiment, the process of the invention is directed to stabilizing of a perfumed aqueous composition, whereby said perfume component is a plant essential oil and/or plant extract and/or isolated fraction and/or isolated compound thereof.

In a further preferred embodiment, the process of the invention is directed to stabilizing of a perfumed aqueous composition, whereby said perfume component is at least one plant essential oil. In a further preferred embodiment, said at least one essential oil is obtainable by a hydrodistillation of a plant material.

The term "hydrodistillation" as used herein means a special type of distillation (a separation process) for temperature sensitive materials like natural aromatic compounds. Hydrodistillation is a traditional method for the extraction of bioactive compounds from plants. In said method, plant materials are packed in a still compartment then water is added in sufficient amount and brought to a boil. It has been the main method of flavor extraction and the official standard method for extracting essential oils in the food, pharmaceutical and cosmetics industries. In this standard method the distillation procedure is closely defined by the plant products to be hydro-distilled, according to the reference method indicated in the relevant literature of Pharmacopoeia. During hydrodistillation the essential oil components form an azeotropic mixture with water. Most of the essential oils do not mix with water in the liquid phase after condensation. Based on the plant material and a type or location of the essential oil (type of plant secretory structures), the process typically takes from 15 min to 4 hours or longer. The extraction period influences not only the yield but also the essential oil composition. Hydrodistillation can be achieved by one of the two methods: a) Clevenger distillation—the material to be extracted is immersed in water, which is then boiled and b) Steam distillation—steam passes through a bed of the material to be extracted.

In both methods the vapors of the volatile components are carried by the steam to a condenser. On condensation oil-rich and water-rich layers are formed. These are typically separated by decantation, or the obtained mixtures can be used in a non-separated form.

In a third aspect the present invention relates to a use of the stabilized perfumed aqueous composition of the invention or a perfumed aqueous composition stabilized in a process of the invention in cosmetics, personal care and cleaning products.

The preferred embodiment is shown in claim 14. In a preferred embodiment, the said stabilized perfumed aqueous composition at least partially replaces preservative agent.

The use as described herein provides an advantageous effect as it provides a natural and nature-based compositions, that are of a pleasant smell, well compatible with water and do not require the use of an excess surfactant. Moreover, the use of the stabilized perfumed aqueous composition of the invention offers a replacement for expensive and potentially toxic and allergenic synthetic antimicrobial preservative agents, which are conventionally used in the products on the market.

DETAILED DESCRIPTION OF THE INVENTION

The present invention concerns the stabilized perfumed aqueous composition comprising:

a) 95.1 to 99.9 wt. % of a component (A), wherein said component (A) is a perfume component in a concentration of at most 30 wt. % in water;

b) 0.1 to 4.9 wt. % of a component (B), wherein said component (B) is 1,2-pentanediol. In a preferred embodiment, said component (A) is a saturated composition of perfume components in water.

In a second aspect, the present invention relates to a process for stabilizing of a perfumed aqueous composition by addition 0.1 to 4.9 wt. % of 1,2-pentanediol to a perfumed aqueous composition, wherein said perfumed aqueous composition is a composition comprising at most 30 wt. % of a perfume component in water.

In a third aspect, the present invention relates to a use of the stabilized perfumed aqueous composition of the invention or the perfumed aqueous composition stabilized in the process of the invention in cosmetics, personal care and cleaning products.

Unless otherwise defined, all terms used in disclosing the invention, including technical and scientific terms, have the meaning as commonly understood by one of ordinary skill in the art to which this invention belongs. By means of further guidance, term definitions are included to better appreciate the teaching of the present invention.

As used herein, the following terms have the following meanings:

"A", "an", and "the" as used herein refers to both singular and plural referents unless the context clearly dictates otherwise. By way of example, "a compartment" refers to one or more than one compartment.

"About" as used herein referring to a measurable value such as a parameter, an amount, a temporal duration, and the like, is meant to encompass variations of +/−20% or less, preferably +/−10% or less, more preferably +/−5% or less, even more preferably +/−1% or less, and still more preferably +/−0.1% or less of and from the specified value, in so far such variations are appropriate to perform in the disclosed invention. However, it is to be understood that the value to which the modifier "about" refers is itself also specifically disclosed.

"Comprise", "comprising", and "comprises" and "comprised of" as used herein are synonymous with "include", "including", "includes" or "contain", "containing", "contains" and are inclusive or open-ended terms that specifies the presence of what follows e.g. component and do not exclude or preclude the presence of additional, non-recited components, features, element, members, steps, known in the art or disclosed therein.

Furthermore, the terms first, second, third and the like in the description and in the claims, are used for distinguishing between similar elements and not necessarily for describing a sequential or chronological order, unless specified. It is to be understood that the terms so used are interchangeable under appropriate circumstances and that the embodiments of the invention described herein are capable of operation in other sequences than described or illustrated herein.

The recitation of numerical ranges by endpoints includes all numbers and fractions subsumed within that range, as well as the recited endpoints.

The expression "% by weight", "weight percent", "% wt" or "wt %", here and throughout the description unless otherwise defined, refers to the relative weight of the respective component based on the overall weight of the formulation.

Whereas the terms "one or more" or "at least one", such as one or more or at least one member(s) of a group of members, is clear per se, by means of further exemplification, the term encompasses inter alia a reference to any one of said members, or to any two or more of said members, such as, e.g., any ≥3, ≥4, ≥5, ≥6 or ≥7 etc. of said members, and up to all said members.

Whereas the term "at least partially" means at least 0.1 wt. %, at least 1 wt. %, at least 5 wt. %, at least 10 wt. %, at least 15 wt. %, at least 20 wt. %, at least 25 wt. %, at least 30 wt. %, at least 35 wt. %, at least 40 wt. %, at least 45 wt. %, at least 50 wt. %, at least 55 wt. %, at least 60 wt. %, at least 65 wt. %, at least 70 wt. % at least 75 wt. %, at least 80 wt. %, at least 85 wt. %, at least 90 wt. % at least 95 wt. %, at least 99 wt. %, or any value in between.

Unless otherwise defined, all terms used in disclosing the invention, including technical and scientific terms, have the meaning as commonly understood by one of ordinary skill in the art to which this invention belongs. By means of further guidance, definitions for the terms used in the description are included to better appreciate the teaching of the present invention. The terms or definitions used herein are provided solely to aid in the understanding of the invention.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In a first aspect, the invention provides a stabilized perfumed aqueous composition comprising:

a) 95.1 to 99.9 wt. % of a component (A), wherein said component (A) is a perfume component in a concentration of at most 30 wt. % in water;

b) 0.1 to 4.9 wt. % of a component (B), wherein said component (B) is 1,2-pentanediol.

In a preferred embodiment, the component (A) comprises from about 0.001 wt. % to about 10.0 wt. % of said perfume component in water. In a more preferred embodiment, the component (A) comprises at least 0.01 wt. %, preferably at least 0.1 wt. % of a perfumed component in water, and at most 5 wt. %, preferably at most 7.5 wt. % of a perfumed component in water.

In another embodiment, the said composition is a saturated solution of perfume components in water. The term "saturated solution", as used herein, means a chemical solution containing the maximum concentration of a solute i.e. perfume components dissolved in the solvent i.e. water. The additional perfume components would not dissolve in a saturated solution. Some of the non-limiting examples for the concentrations of the perfumed component in water which leads to obtaining of the saturated solution within the scope of this invention are within the range of 0.00001 wt. % and 30.00000 wt. %, preferably within the range of 0.0001 wt. % to 20.0000 wt. %, even more preferably within the range of 0.001 wt. % to 10.000 wt. %, most preferably within the range of 0.01 wt. % and 2.00 wt. %. In a preferred embodiment, said concentration of perfume components in water yielding a saturated solution thereof is 0.02 wt. %, 0.04 wt. %, 0.06 wt. %, 0.08 wt. %, 0.10 wt. %, 0.12 wt. %, 0.14 wt. %, 0.16 wt. %, 0.18 wt. %, 0.20 wt. %, 0.22 wt. %, 0.24 wt. %, 0.26 wt. %, 0.28 wt. %, 0.30 wt. %, 0.32 wt. %, 0.34 wt. %, 0.36 wt. %, 0.38 wt. %, 0.40 wt. %, 0.42 wt. %, 0.44 wt. %, 0.46 wt. %, 0.48 wt. %, 0.50 wt. %, 0.52 wt. %, 0.54 wt. %, 0.56 wt. %, 0.58 wt. %, 0.60 wt. %, 0.62 wt. %, 0.64 wt. %, 0.66 wt. %, 0.68 wt. %, 0.70 wt. %, 0.72 wt. %, 0.74 wt. %, 0.76 wt. %, 0.78 wt. %, 0.80 wt. %, 0.82, wt. %, 0.84 wt. %, 0.86 wt. %, 0.88 wt. %, 0.90 wt. %, 0.92 wt. %, 0.94 wt. %, 0.96 wt. %, 0.98 wt. %, 1.00 wt. %, 1.02 wt. %, 1.04 wt. %, 1.06 wt. %, 1.08 wt. %, 1.10 wt. %, 1.12 wt. %, 1.14 wt. %, 1.16 wt. %, 1.18 wt. %, 0.1.20 wt. %, 1.22 wt. %, 1.24 wt. %, 1.26 wt. %, 1.28 wt. %, 1.30 wt. %, 1.32 wt. %, 1.34 wt. %, 1.36 wt. %, 1.38 wt. %, 1.40 wt. %, 1.42 wt. %, 1.44 wt. %, 1.46 wt. %, 1.48 wt. %, 1.50 wt. %, 1.52 wt. %, 1.54 wt. %, 1.56 wt. %, 1.58 wt. %, 1.60 wt. %, 1.62 wt. %, 1.64 wt. %, 1.66 wt. %, 1.68 wt. %, 1.70 wt. %, 1.72 wt. %, 1.74 wt. %, 1.76 wt. %, 1.78 wt. %, 1.80 wt. %. 1.82 wt. %, 1.84 wt. %, 1.86 wt. %, 1.88 wt. %, 1.90 wt. %, 1.92 wt. %, 1.94 wt. %, 1.96 wt. %, 1.98 wt. %, 2.00 wt. % or any value in between.

The inventors have unexpectedly observed that the addition of 1,2-pentanediol (component (B)) as single additive at concentrations of less than 5 wt. %, preferably in range of 0.1 to 4.9 wt. %, can stabilize perfumed aqueous composition of the invention. The addition of 1,2-pentanediol in concentration of 0.1 to 4.9 wt % calculated on the basis of the weight of the stabilized perfumed aqueous composition of the invention solves the technical problem of obtaining the composition of the perfumed water is uniform due to the solubilisation or uniform dispersion of its lipophilic components.

It is known that 1,2-alkanediols can physically stabilize aqueous solutions of essential oils when used in high and excess concentrations and as a major constituent of the solution. One example is a solution of rose oil and water in 1,2-pentanediol which is commercially available under the trade name ROSALITY® (IFF Lucas Meyer).

It was now surprisingly found that much lower quantities of 1,2-pentanediol can also physically stabilize compositions comprising essential oils and water. The lipophilic components are either solubilized or uniformly dispersed. It was found that less than 5 wt. %, preferably 0.1 to 4.9 wt. % of 1,2-pentanediol as single additive is already sufficient to significantly elongate the phase separation times between the perfume component and water in said stabilized perfumed aqueous composition of the invention. The above-referenced background prior art does not disclose hydrolats which comprise 1,2-pentanediol at such concentrations as a sole stabilizing additive.

The overall stability and the shelf-life of stabilized perfumed aqueous composition of the invention is enhanced by addition of 1,2-pentanediol in a concentration of less than 5%, preferably in a concentration of 0.1 to 4.9 wt. %. The physically stabilized aqueous hydrolats do not have to be mixed before usage. This leads to an improved safety, more uniform dosing in multi-dosage package systems, and improved productivity on a production site and the reduction in production costs.

In another preferred embodiment, the said stabilized perfumed aqueous composition at least partially replaces surfactants in a cosmetics, cleaning or personal care product. The less artificial ingredients in said stabilized perfumed aqueous composition of the invention provides better skin tolerability, better compatibility with other ingredients, more nature-based products of a green label.

In a preferred embodiment of the invention, in the stabilized perfumed aqueous composition the said perfume components of the component (A) are chosen from a group containing plant essential oil and/or plant extract and/or isolated fraction and/or isolated compound thereof. In a particularly preferred embodiment, said perfume components are at least one plant essential oil.

In another preferred embodiment, the stabilized perfumed aqueous composition of the invention comprises the said perfume components of the component (A) are an essential oil and/or isolated fraction and/or isolated compound thereof produced by steam distillation of vegetal raw materials.

The stabilized perfumed aqueous composition of the invention is preferably nature-derived product, most preferably a natural perfumed or flower water, which utilizes the aqueous distillate obtainable by a steam or hydro-distillation of a fresh or dried plant material. In a preferred embodiment, the plant species from the following families are used to obtain the stabilized perfumed aqueous composition of the invention: Annonaceae, Apiaceae, Asteraceae, Geraniaceae, Lauraceae, Myrtaceae, Orchidaceae, Poaceae, Rosaceae, Rutaceae, Verbenaceae, and the like.

In a further preferred embodiment, the stabilized perfumed aqueous composition comprises at least one essential oil. In a further preferred embodiment, said at least one essential oil is obtainable from the plant species chosen from the group comprising *Cananga odorata, Cedrus atlantica, Chrysopogon zizanioides, Cladanthus mixtus, Cinnamomum verum, Cinnamomum cassia, Citrus aurantium, Citrus aurantium amara, Citrus bergamia, Citrus glauca, Citrus limon, Citrus maxima, Citrus reticulata, Eucalyptus globulus, Eucalyptus calmendulensis, Juniperus oxycedrus, Laurus nobilis, Lavandula angustifolia, Lavandula latifolia, Lippia citriodora, Matricaria recutita, Melaleuca bracteata, Melissa officinalis, Mentha* x *piperitha, Mentha pulegium, Mentha spicata, Myrtus communis, Origanum compactum, Pelargonium roseum, Pogostemon cablin, Rosa centifolia, Rosa* x *damascena, Rosmarinus officinalis, Santalum album, Santalum spicatum, Salvia officinalis, Tanacetum annuum, Thymus serpyllum, Thymus vulgaris, Thymus satureoides, Calocedrus* sp., *Citronella* sp., *Geranium* sp., *Pinus* sp., *Vanilla* sp. and the like. In a further preferred embodiment, said essential oil, essential oil isolate or a component thereof is isolated from the plant species chosen from the group consisting of *Cananga odorata, Cedrus atlantica, Chrysopogon zizanioides, Cinnamomum verum, Citrus aurantium amara, Citrus bergamia, Eucalyptus globulus, Lavandula angustifolia, Lippia citriodora, Matricaria recutita, Rosa* x *damascene, Santalum album, Santalum spicatum, Geranium* sp., *Pinus* sp., *Pogostemon cablin, Vanilla* sp. Non-limiting examples of suitable essential oils are rose essential oils, in particular rose damascene essential oil, sandalwood essential oils, *eucalyptus* essential oils, orange essential oil, orange flower (neroli) essential oil, geranium essential oil, bergamot essential oil, lavender essential oil, chamomile essential oil, patchouli essential oil, *verbena* essential oil, ylang ylang essential oil and cinnamon essential oil.

In another embodiment, the stabilized perfumed aqueous composition of the invention comprises an isolated essential oil component as a perfume component of a component (A). Some non-limiting examples for compounds isolated from essential oils are cinnamaldehyde, thymol, menthol, menthone, eucalyptol, caryophyllene, caryophyllene oxide, bisabolol, chamazulene, limonene, citronellal, citronellol, linalool, tetrahydrolinalool, vanillin, isopropyl myristate, piperonal, geraniol, citral, gamma-terpinene, alpha-pinene, beta-pinene, alpha-terpineol, terpinolene, para-cymene, trans-anethole, linalyl acetate, camphene, terpinene-4-ol, alpha-terpinene, borneol, camphene, geranyl-acetate, geraniol, nerol, nerol-acetate, isoborneol, 2-methyl 1,3-cyclohexadiene, myrcene, patchoulol and the like. In another preferred embodiment, the content of the components (A) and (B) adds up to 100 wt. %, i. e., the stabilized perfumed aqueous composition of the invention contains exclusively components (A) and (B).

It has been unexpectedly found that the stabilized perfumed aqueous composition of the invention can be utilized in various food, cosmetics and pharmaceutical preparations without use of additional additives. In a preferred embodiment, the stabilized perfumed aqueous composition of the invention is used in cosmetics, personal care and cleaning compositions.

The stabilized perfumed aqueous compositions of the invention do not require additional, artificial acidification to pH values of less than 5, which is mainly effective against bacteria, but it does not prevent a contamination of the stabilized perfumed aqueous composition by fungi (i.e. yeasts and moulds).

The stabilized perfumed aqueous compositions of the invention do not require protection by conventional preservatives and yet they fulfill the ISO 11930, EP or USP requirements and are characterized by a satisfying shelf life. Typical preservatives such as sorbic acid and/or potassium sorbate and benzoic acid and/or sodium benzoate are effective only at low pH-values. Furthermore, these ingredients may cause an allergic skin reaction. Dehydroacetic acid (DHA) causes a yellowing of the aqueous solution. DHA is also just hardly soluble in water, which limits its effective concentration. Aromatic alcohols which are used as preservatives, such as benzyl alcohol, introduce an additional odour, which is usually not desired for perfuming products. Short chain glycols, such as propylene glycol or butylene glycol are weak antimicrobial agents and only effective at high concentrations of typically more than 10%. This leads to a significant dilution of the perfumed water. Further additives are often needed for a complete protection. Longer chain glycols such as 1,2-hexanediol, 1,2-octanediol or ethylhexylglycerin can be hardly solubilized in water and they are known for changing the physical properties of hydrogels or emulsions. It can therefore be difficult to incorporate the stabilized perfumed waters in personal care formulations. Furthermore, the lipophilic diols together with perfuming ingredients can form a separate lipophilic phase. The homogeneity of the perfumed mixture can therefore be disturbed.

In another preferred embodiment, the stabilized perfumed aqueous composition of the invention said compositions contain in the component (A) a quantity of perfume components and wherein said quantity of perfume components is not completely soluble in water.

It was unexpectedly found that 1,2-pentanediol in concentration of 0.1 to 4.9 wt. % stabilizes the dispersion of perfume component in a solvent such as water.

In another preferred embodiment, the time of phase separation between the perfume components and the water phase of the component (A) is at least 72 h.

It has surprisingly been found that the stabilized perfumed aqueous compositions of the invention do not require the excess amount of surfactant or any other co-additives to be of a satisfying dispersion stability, whereby the phase separation of a perfume component and water phase is avoided for at least 72 h, preferably at least 5 days, most preferably at least 7 days. Moreover, the stabilized perfumed aqueous compositions of the invention do not require the presence of preservative and/or antimicrobial agent.

The stabilized perfumed aqueous compositions of the invention solve the technical problem of the microbial infestations of natural perfumed waters or hydrolats. In the compositions of the invention, the growth of microorganisms is effectively prevented at concentrations below the minimum inhibitory concentration of the diol. The 1,2-pentanediol used for stabilization of stabilized perfumed aqueous compositions of the invention is preferably nature-derived, but it can also be of petrochemical origin. Most preferably, nature-derived 1,2-pentanediol is used as stabilizing additive. Such product is commercially available from MINASOLVE under the trade name "A-Leen 5".

The stabilizing 1,2-pentanediol can be added at any time during the preparation of the stabilized perfumed aqueous compositions of the invention. A preferred point of addition is after the steam distilled essential oil has been separated from the remaining aqueous phase. The 1,2-pentanediol can be added at any temperature and pressure. Preferably the diol is added at atmospheric pressure and between 0° C. and 100° C.

In another embodiment of the invention, natural raw materials containing perfuming ingredients are brought in contact with a mixture of water and 1,2-pentanediol. The obtained extract is physically stable and protected against microbial infection.

The concentration of the component (B) i.e. 1,2-pentanediol in stabilized perfumed waters can vary between 0.1 wt. % and less than 5.0 wt. %, preferably between 0.1 wt. % and 4.9 wt. %, more preferably between 1.0 wt. % and 3.0 wt. %. The concentration of 1,2-pentanediol may be 1.0 wt. %, 1.25 wt. %, 1.5 wt. %, 1.75 wt. %, 2.0 wt., 2.25 wt. %, 2.5 wt. %, 2.75 wt. %, 3.0 wt. or any value in between. In a particularly preferred embodiment, the stabilized perfumed aqueous composition of the invention passes a microbial challenge test according to ISO 11930.

In another preferred embodiment, the stabilized perfumed aqueous composition of the invention comprises the amount of the component (B) added to the component (A) is below the minimum inhibitory concentration of the component (B) against bacteria and/or yeasts and/or moulds.

Many hydrolats are self-preserving against bacteria, partly due to their inherently low pH-value. However, most hydrolats are not self-preserving against fungi.

It is known that 1,2-pentanediol can protect hydrolats against microbial contamination. However, its typical use-level is 5%, which corresponds to the minimum inhibitory concentration (MIC) of 1,2-pentanediol against bacteria and fungi. Typical examples are hydrolats offered by the company "Plantes Aromatiques du Diois", which are listed in the database of "Cosmetic raw materials certified by Ecocert under Cosmos standard".

It was now surprisingly found that concentrations of 1,2-pentanediol below its MIC of 5% are already sufficient for a complete protection. The diol acts synergistically with the antimicrobial perfuming agents present inside the hydrolat. Low concentrations of 1,2-pentanediol below its MIC of 5% are therefore sufficient to close the gap of protection, in particular against fungi. This finding represents an economical advantage, since the cost of the perfumed waters decrease significantly, if the concentration of the stabilizing additive 1,2-pentanediol can be decreased.

In a second aspect, the present invention relates to a process for stabilizing of a perfumed aqueous composition by addition 0.1 to 4.9 wt. % of 1,2-pentanediol to a perfumed aqueous composition, wherein said perfumed aqueous composition is a composition comprising at most 30 wt. % of a perfume component in water.

In a preferred embodiment, the process for stabilizing of a perfumed aqueous composition of the invention is used for such compositions whereby said perfume component of said perfumed aqueous composition is a plant essential oil and/or plant extract and/or isolated fraction and/or isolated compound thereof.

In another preferred embodiment, the process for stabilizing of a perfumed aqueous composition of the invention is used for such compositions whereby said perfume component is plant essential oil, or the water-soluble part thereof, obtainable by a hydro-distillation of a plant material.

However, it is obvious that the invention is not limited to application only in essential oil comprising perfuming waters. The process for stabilizing perfumed waters according to the invention can be applied in all sorts of aqueous perfume compositions, regardless of the nature and/or origin of perfuming components therein.

The content of 1,2-pentanediol within the stabilized perfumed aqueous composition of the invention can vary between 0.1 wt. % and less than 5.0 wt. %, and preferably is at least 1 wt. % and at most 3 wt. %. The said content can be 1.0 wt. %, 1.5 wt. %, 2.0 wt. %; 2.5 wt. % and 3.0 wt. % or any value in between without departing from the scope of the invention.

In a third aspect, the present invention relates to the stabilized perfumed aqueous composition of the invention or obtained by the process of the invention in cosmetics, personal care and cleaning products.

In a preferred embodiment, the present invention relates to the use of the stabilized perfumed aqueous composition whereby said stabilized perfumed aqueous composition at least partially replaces preservative agent. In one embodiment, the said stabilized perfumed aqueous composition completely replaces preservative agent. The term "at least partially", as used herein, means that said stabilized perfumed aqueous composition of the invention replaces about 0.1 wt %, 5.0 wt %, 10.0 wt %, 15.0 wt %, 20.0 wt %, 25.0 wt %, 30.0 wt %, 35.0 wt %, 40.0 wt %, 45.0 wt %, 50.0 wt %, 55.0 wt %, 60.0 wt %, 65.0 wt %, 70.0 wt %, 75.0 wt %, 80.0 wt %, 85.0 wt %, and 90.0 wt % of the preservative agent used in the cosmetics, personal care and cleaning products of the invention. The term "completely" as used herein, means that stabilized perfumed aqueous composition of the invention replaces more than 90.0 wt % of preservative agent used in the cosmetics, personal care and cleaning products.

In a preferred embodiment, the present invention relates to the use of the stabilized perfumed aqueous composition whereby said stabilized perfumed aqueous composition at least partially replaces surfactant. In one embodiment, the said stabilized perfumed aqueous composition completely replaces surfactant. The term "at least partially", as used herein, means that said stabilized perfumed aqueous composition of the invention replaces about 0.1 wt %, 5.0 wt %, 10.0 wt %, 15.0 wt %, 20.0 wt %, 25.0 wt %, 30.0 wt %, 35.0 wt %, 40.0 wt %, 45.0 wt %, 50.0 wt %, 55.0 wt %, 60.0 wt %, 65.0 wt %, 70.0 wt %, 75.0 wt %, 80.0 wt %, 85.0 wt %, and 90.0 wt % of the surfactant used in the cosmetics, personal care and cleaning products of the invention. The term "completely" as used herein, means that stabilized perfumed aqueous composition of the invention replaces more than 90.0 wt % of surfactant used in the cosmetics, personal care and cleaning products.

The stabilized perfumed waters according to the present invention can be used as ingredients for personal care products, such as—but not limited to:

a. Solutions,
b. Suspensions,
c. Emulsions,
d. Gels,
e. Ointments,
f. Pastes,
g. Powders,
h. Foams,
i. Soaps,
j. Capsules,
k. Combinations of a-j.

The invention is further described by the following non-limiting examples which further illustrate the invention, and are not intended to, nor should they be interpreted to, limit the scope of the invention.

EXAMPLES

The present invention will now be further exemplified with reference to the following examples. The present invention is in no way limited to the given examples or to the embodiments presented in the figures.

Example 1. *Rosa* x *Damascena* Flower Water of the Invention

*Rosa* x *damascena* flower water was obtained by steam distillation of fresh damask rose flowers. The concentration of perfuming components inside the rose (*Rosa* x *damascena*) water was about 0.1 wt. %. The obtained water was stabilised by addition of 2.5 wt. % 1,2-pentanediol. The stability of the protected solution was compared against the non-protected hydrolat in a microbial challenge test according to ISO 11930. During the test the hydrolat was infected with a certain number of different microorganisms at the time point marked as "0 h". The infected hydrolats were incubated and the quantity of remaining microorganisms was counted after 7, 14 and 28 days of incubation time.

The water stabilized with 1,2-pentanediol was unexpectedly found to fulfil criteria B of the ISO norm 11930 without the necessity to add further preservatives to it. On the other hand, the non-protected water (without 1,2-pentanediol) failed the challenge test due to an increase of the germ count of *Aspergillus brasiliensis* after 14 days and 28 days. The hydrolat containing 1,2-pentanediol is therefore sufficiently protected against microbial contamination. The obtained test results are summarized in table 1. The number of germs is expressed as colony forming units (cfu) per gram.

TABLE 1

Effect of addition of 2.5 wt. % of 1,2-pentanediol on the microbial stability of *Rosa* × *damascena* flower water (ISO 11930).

| | cfu/g *Rosa* × *damascena* flower water | | | | | | | |
|---|---|---|---|---|---|---|---|---|
| | not stabilized | | | | stabilized with 2.5% 1,2-pentanediol | | | |
| Germ type | 0 h | 7 days | 14 days | 28 days | 0 h | 7 days | 14 days | 28 days |
| *Aspergillus brasiliensis* | 190000 | 160000 | 210000 | 280000 | 490000 | 280000 | 210000 | 200000 |
| *Candida albicans* | 360000 | 110000 | 510 | <10 | 450000 | 260 | <10 | <10 |
| *Pseudomonas aeruginosa* | 410000 | 85 | <10 | <10 | 380000 | <10 | <10 | <10 |
| *Staphylococcus aureus* | 330000 | 110 | <10 | <10 | 270000 | <10 | <10 | <10 |
| *Escherichia coli* | 130000 | 35 | <10 | <10 | 270000 | <10 | <10 | <10 |

Example 2. *Lippia citriodora* Perfumed Water

*Lippia citriodora* perfumed water was obtained by steam distillation of flowers, leaves and stems of the lemon *verbena*. The concentration of perfuming components inside the *Lippia citriodora* hydrolat was about 0.1 wt. %. The hydrolat was stabilised by addition of 1.5 wt. % 1,2-pentanediol. The antimicrobial protection effect was evaluated against the non-protected hydrolat in a microbial challenge test according to ISO 11930. The stabilized water fulfilled criteria A of the ISO norm, while the non-protected water failed the challenge test due to the increase of the germ count of *Aspergillus brasiliensis* after 14 days and 28 days. The obtained results are summarized in Table 2.

TABLE 2

Effect of addition of 1.5 wt. % of 1,2-pentanediol on the microbial stability of *Lippia citriodora* perfumed water (ISO 11930).

| | cfu/g *Lippia citriodora* perfumed Water (Verbena) | | | | | | | |
|---|---|---|---|---|---|---|---|---|
| | not stabilized | | | | stabilized with 1.5% 1,2-pentanediol | | | |
| Germ type | 0 h | 7 days | 14 days | 28 days | 0 h | 7 days | 14 days | 28 days |
| *Aspergillus brasiliensis* | 330000 | 350000 | 390000 | 390000 | 250000 | 220000 | 35000 | 670 |
| *Candida albicans* | 440000 | <10 | <10 | <10 | 450000 | <10 | <10 | <10 |
| *Pseudomonas aeruginosa* | 790000 | <10 | <10 | <10 | 620000 | <10 | <10 | <10 |
| *Staphylococcus aureus* | 380000 | <10 | <10 | <10 | 300000 | <10 | <10 | <10 |
| *Escherichia coli* | 350000 | <10 | <10 | <10 | 180000 | <10 | <10 | <10 |

Example 3. *Eucalyptus globulus* Perfumed Water

*Eucalyptus globulus* perfumed (leaf) water was obtained by steam distillation of fresh eucalyptus leaves. The concentration of perfuming components inside the *Eucalyptus globulus* hydrolat was about 0.5 wt. %. The hydrolat was stabilized by addition of 2.0 wt. % 1,2-pentanediol. The antimicrobial protection effect was evaluated against the non-protected hydrolat in a microbial challenge test according to ISO 11930. The stabilized water fulfilled criteria A of the ISO norm, while the non-protected water failed the challenge test due to an increase in the germ count of *Aspergillus brasiliensis* after 14 days and 28 days. The obtained results are summarized in Table 3.

TABLE 3

Effect of addition of 2.0 wt. % of 1,2-pentanediol on the microbial stability of *Eucalyptus globulus* (leaf) perfumed water (ISO 11930).

| | cfu/g *Eucalyptus globulus* perfumed (leaf) water | | | | | | | |
|---|---|---|---|---|---|---|---|---|
| | not stabilized | | | | stabilized with 2.0% 1,2-pentanediol | | | |
| Germ type | 0 h | 7 days | 14 days | 28 days | 0 h | 7 days | 14 days | 28 days |
| *Aspergillus brasiliensis* | 470000 | 220000 | 230000 | 280000 | 420000 | 170000 | 70000 | 11000 |
| *Candida albicans* | 530000 | <10 | <10 | <10 | 520000 | <10 | <10 | <10 |
| *Pseudomonas aeruginosa* | 870000 | <10 | <10 | <10 | 870000 | <10 | <10 | <10 |
| *Staphylococcus aureus* | 370000 | <10 | <10 | <10 | 240000 | <10 | <10 | <10 |
| *Escherichia coli* | 370000 | <10 | <10 | <10 | 330000 | <10 | <10 | <10 |

Example 4. *Citrus aurantium amara* (Bitter Orange) Flower Water

*Citrus aurantium amara* (bitter orange) flower water was obtained by steam distillation of fresh flowers and buds of the bitter orange, after the removal of the essential oil. The concentration of perfuming components inside the Neroli flower water was about 0.5 wt. %. The flower water was stabilized by addition of 1.5 wt. % 1,2-pentanediol. The antimicrobial protection effect was evaluated against the non-protected hydrolat in a microbial challenge test according to ISO 11930. The stabilized water fulfilled criteria A of the ISO norm, while the non-protected water fulfilled only criteria B due to a lower reduction of the germ counts of *Aspergillus brasiliensis* and *Candida albicans*. The obtained results are summarized in Table 4.

TABLE 4

Effect of addition of 1.5 wt. % of 1,2-pentanediol on the microbial stability of *Citrus aurantium amara* flower water (ISO 11930).

| | cfu/g *Citrus aurantium amara* (bitter orange) flower water (Neroli) | | | | | | | |
|---|---|---|---|---|---|---|---|---|
| | not stabilized | | | | stabilized with 1.5% 1,2-pentanediol | | | |
| Germ type | 0 h | 7 days | 14 days | 28 days | 0 h | 7 days | 14 days | 28 days |
| *Aspergillus brasiliensis* | 400000 | 330000 | 75000 | 43000 | 160000 | 130000 | 50000 | 17000 |
| *Candida albicans* | 680000 | 70000 | 24000 | 6100 | 320000 | 21000 | 490 | <10 |
| *Pseudomonas aeruginosa* | 540000 | <10 | <10 | <10 | 620000 | <10 | <10 | <10 |
| *Staphylococcus aureus* | 340000 | <10 | <10 | <10 | 350000 | <10 | <10 | <10 |
| *Escherichia coli* | 340000 | 260 | 65 | <10 | 180000 | <10 | <10 | <10 |

Example 5. *Cedrus atlantica* Perfumed Water

*Cedrus atlantica* perfumed water was obtained by steam distillation of the bark of the atlas cedar. The concentration of perfuming components inside the *Cedrus atlantica* hydrolat was about 0.1 wt. %. The hydrolat was stabilized by addition of 2.5 wt. % 1,2-pentanediol. The antimicrobial protection effect was evaluated against the non-protected hydrolat in a microbial challenge test according to ISO 11930. The stabilized water fulfilled criteria B of the ISO norm, while the non-protected water failed the challenge test due to increase in germ count of *Aspergillus brasiliensis* after 14 days and 28 days, as wells as insufficient reduction of *Candida albicans* within 7 days. The obtained results are summarized in Table 5.

TABLE 5

Effect of addition of 2.5 wt. % of 1,2-pentanediol on the microbial stability of *Cedrus atlantica* perfumed water (ISO 11930).

| | cfu/g *Cedrus atlantica* bark water | | | | | | | |
|---|---|---|---|---|---|---|---|---|
| | not stabilized | | | | stabilized with 2.5% 1,2-pentanediol | | | |
| Germ type | 0 h | 7 days | 14 days | 28 days | 0 h | 7 days | 14 days | 28 days |
| *Aspergillus brasiliensis* | 410000 | 310000 | 370000 | 390000 | 530000 | 380000 | 360000 | 280000 |
| *Candida albicans* | 550000 | 110000 | 47000 | 36000 | 670000 | 42000 | 37000 | 34000 |
| *Pseudomonas aeruginosa* | 380000 | <10 | <10 | <10 | 640000 | <10 | <10 | <10 |
| *Staphylococcus aureus* | 370000 | <10 | <10 | <10 | 260000 | <10 | <10 | <10 |
| *Escherichia coli* | 350000 | <10 | <10 | <10 | 360000 | <10 | <10 | <10 |

Example 6. Physical Stabilization

Hydrolats are aqueous solutions obtained by steam distillation of vegetal materials during the production of essential oils. Hydrolats can therefore be considered as saturated aqueous solutions of essential oils or of the most water-soluble compartments thereof. The phase separation between a hydrolat and an essential oil can take a long time, which makes it difficult to obtain hydrolats of uniform composition. Long phase separation times also reduce the productivity of the process and increase the production costs.

In order to evaluate phase separation times, different essential oils (1.0 g) were mixed with water (100 g) by shaking for 30 seconds in 100 mL glass bottles. The mixtures were left standing at ambient temperature. The amount of time it took until a clear lower phase was formed was considered as "time of phase separation". To these mixtures a total of 1.5 g, 2.5 g and 4.5 g of 1,2-pentanediol (1,2-PDO) were added. Each of the mixtures was again shaken for 30 seconds and left standing at 20-22° C. The obtained approximate times of phase separation are summarized in Table 6.

TABLE 6

Effects of 1,2-pentanediol on separation times of various essential oil/water mixtures. Meaning of the abbreviation 1,2-PDO: 1,2-pentanediol.

| 1 g essential oil | time of phase separation after mixing with 100 g demineralised water +0 g 1,2-PDO | +1.5 g 1,2-PDO | +2.5 g 1,2-PDO | +4.5 g 1,2-PDO |
|---|---|---|---|---|
| *Lippia citriodora* flower/leaf/stem oil | 36 h | 48 h | >72 h | >72 h |
| *Eucalyptus globulus* leaf oil | 3 h | 4 h | 9 h | 72 h |
| *Rosmarinus officinalis* leaf oil | 8 h | 12 h | >72 h | >72 h |
| *Juniperus oxycedrus* fruit oil | 24 h | 48 h | >72 h | >72 h |
| *Mentha spicata* flower/leaf/stem oil | 24 h | 24 h | >72 h | >72 h |
| *Artemisia alba* herb oil | 10 h | 24 h | >72 h | >72 h |

It was hereby demonstrated that long phase separations are a hurdle for producing uniform hydrolats. By addition of 1,2-pentanediol, the time of phase separation between essential oil and hydrolat was significantly elongated. The mixtures containing 1,2-pentanediol showed significantly longer times of phase separation compared to the mixture without 1,2-pentanediol. It was hence demonstrated that 1,2-pentanediol stabilizes mixtures of essential oils and water. This avoids the necessity for a complete removal of the essential oils from the hydrolats, since the hydrolats containing 1,2-pentanediol together with an excess of essential oil still have a uniform composition.

It is supposed that the present invention is not restricted to any form of realization described previously and that some modifications can be added to the presented example of fabrication without reappraisal of the appended claims. For example, the present invention has been described referring to the particular essential oils such as *Rosa* x *damascena* flower water, *Lippia citriodora* perfumed water, *Eucalyptus globulus* perfumed water but it is clear that the invention can be applied to any other species from the genera *Rosa, Lippia* and/or *Eucalyptus* for instance or to any other hydrolat obtainable from another plant source such as, but not limited to species of the families Lamiaceae, Asteraceae, Apiaceae, Lauraceae, Myrtaceae, Rosaceae and the like.

The present invention is in no way limited to the embodiments described in the examples and/or shown in the figures. On the contrary, methods according to the present invention may be realized in many different ways without departing from the scope of the invention.

The invention claimed is:

1. Stabilized perfumed aqueous composition comprising:

a) 95.1 to 99.9 wt. % of a component (A), wherein said component (A) is a perfume component in a concentration of at most 30 wt. % in water;

b) 0.1 to 4.9 wt. % of a component (B), wherein said component (B) is a preservative consisting of 1,2-pentanediol, wherein said perfume component of the component (A) is chosen from a group containing plant essential oil and/or plant extract and/or an isolated fraction and/or isolated compound thereof; and wherein component (B) is the sole preservative in the stabilized perfumed aqueous composition.

2. The stabilized perfumed aqueous composition according to claim 1, wherein said component (A) comprises from about 0.001 wt. % to about 10.0 wt. % of said perfume component in water.

3. The stabilized perfumed aqueous composition of claim 1, wherein said perfume component of the component (A) comprises at least one plant essential oil.

4. The stabilized perfumed aqueous composition according to claim 1 wherein the contents of the components (A) and (B) add up to 100 wt. %.

5. The stabilized perfumed aqueous composition according to claim 1 that pass a microbial challenge test according to ISO 11930.

6. The stabilized perfumed aqueous composition according to claim 1, wherein the amount of the component (B) added to the component (A) is below the minimum inhibitory concentration of the component (B) against bacteria and/or yeasts and/or moulds.

7. The stabilized perfumed aqueous composition according to claim 1 whereby said compositions contain in the component (A) a quantity of perfume component and wherein said quantity of perfume component is not completely soluble in water.

8. The stabilized perfumed aqueous composition according to claim 7, whereby the time of phase separation of the component (A) into the perfume component and the water phase is at least 72 h.

9. The stabilized perfumed aqueous composition according to claim 1, wherein the said perfume components of the component (A) are selected from the group consisting of an essential oil, an isolated fraction, an isolated compound of an isolated fraction produced by steam distillation of vegetal raw materials, and combinations thereof.

10. Process for stabilizing of a perfumed aqueous composition by addition 0.1 to 4.9 wt. % of 1,2-pentanediol to a perfumed aqueous composition, wherein said perfumed aqueous composition is a composition comprising at most 30 wt. % of a perfume component in water.

11. The process for stabilizing of a perfumed aqueous composition according to claim 10, whereby said perfume component is a plant essential oil and/or plant extract, isolated fraction and/or isolated compound thereof.

12. The process for stabilizing of a perfumed aqueous composition according to claim 10, whereby said perfume component is a plant essential oil obtainable by a hydrodistillation of a plant material.

13. Use of the stabilized perfumed aqueous composition according to either:

(i) comprising: a) 95.1 to 99.9 wt. % of a component (A), wherein said component (A) is a perfume component in a concentration of at most 30 wt. % in water; b) 0.1 to 4.9 wt. % of a component (B), wherein said component (B) is a preservative consisting of 1,2-pentanediol, wherein said perfume component of the component (A) is chosen from a group containing plant essential oil and/or plant extract and/or an isolated fraction and/or isolated compound thereof and wherein component (B) is the sole preservative in the stabilized perfumed aqueous composition, or (ii) made by a process for stabilizing of a perfumed aqueous composition by addition 0.1 to 4.9 wt. % of 1,2-pentanediol to a perfumed aqueous composition, wherein said perfumed aqueous composition is a composition comprising at most 30 wt. % of a perfume component in water, by adding the composition to personal care and cleaning products.

14. The use according to claim 13 whereby said stabilized perfumed aqueous composition at least partially replaces preservative agent.

* * * * *